United States Patent [19]
Spencer et al.

[11] Patent Number: 5,121,233
[45] Date of Patent: Jun. 9, 1992

[54] MULTI-COLOR DISPLAY

[75] Inventors: Gordon R. Spencer, Westwood, Mass.; David B. Kanaly, Melbourne, Fla.

[73] Assignees: Harris Corporation, Melbourne, Fla.; Raytheon Company, Lexington, Mass.

[21] Appl. No.: 510,655

[22] Filed: Apr. 18, 1990

[51] Int. Cl.⁵ .............................................. G02F 1/13
[52] U.S. Cl. ...................................... 359/48; 359/50; 359/54; 358/64; 340/784
[58] Field of Search ................... 350/339 F, 345, 349, 350/333; 340/784, 765; 358/56, 64, 66, 68; 313/367, 463; 359/48, 50, 54

[56] References Cited

U.S. PATENT DOCUMENTS

| | | | |
|---|---|---|---|
| 3,924,227 | 12/1975 | Stolov | 350/339 F |
| 4,368,485 | 1/1983 | Midland | 358/64 |
| 4,611,889 | 9/1986 | Buzak | 350/337 |
| 4,720,655 | 1/1988 | Hinotani et al. | 313/422 |
| 4,799,050 | 1/1989 | Prince et al. | 340/765 |
| 4,822,144 | 4/1989 | Vriens | 350/339 F |
| 4,830,469 | 5/1989 | Breddels et al. | 350/345 |
| 4,838,660 | 6/1989 | Fergason | 350/339 F |
| 4,857,900 | 8/1989 | Rachi | 340/703 |
| 4,865,425 | 9/1989 | Kabayashi et al. | 350/345 |
| 4,870,484 | 9/1989 | Sonehara | 358/59 |
| 4,915,479 | 4/1990 | Clarke | 350/345 |

FOREIGN PATENT DOCUMENTS

| | | | |
|---|---|---|---|
| 0267686 | 5/1988 | European Pat. Off. | 350/345 |
| 0149028 | 8/1985 | Japan | 350/345 |
| 0052533 | 3/1987 | Japan | 350/339 F |
| 0003631 | 1/1989 | Japan | 350/345 |

OTHER PUBLICATIONS

"Cathodoluminescent Back Light for Liquid Crystal Device", Research Disclosure, Jan. 1991, No. 321.
Seminar 1.2, "Vacuum Fluorescent Displays", K. Morimoto et al., May 1986.
"Flat-Panel Displays and CRTs", L. E. Tannas, Jr., 1985 p. 14.
"10.1: Progress of the Flat Channel Multiplier CRT", D. Washington et al., 1985 pp. 166–169.
"Spindt Cold Cathode Vacuum Fluorescent Display", SRI International, C. E. Holland et al., Sep. 1987 pp. 1–3.

Primary Examiner—Rolf Hille
Assistant Examiner—Tan Ho
Attorney, Agent, or Firm—John DeAngelis; Richard M. Sharkansky

[57] ABSTRACT

A display having as a light source thereof an electron tube. The electron tube has disposed in an evacuated envelope thereof a plurality of cathode means, each one thereof adapted to emit electrons in response to a control signal. A plurality of sets of at least one cathodoluminescent stripe is disposed within the envelope. Each one of said sets is associated with a corresponding one of the cathode means and adapted to emit light with a predetermined one of a set of primary colors in response to electrons emitted by the corresponding cathode means striking such stripe. An anode for collecting electrons emitted by said cathode is also disposed within the evacuated envelope.

25 Claims, 4 Drawing Sheets

MULTI-COLOR DISPLAY

BACKGROUND OF THE INVENTION

This invention relates generally to multi-color displays and more particularly to light sources useful in liquid crystal displays (LCDs).

As is known in the art, multi-color liquid crystal displays have a wide range of applications. One such display includes a liquid crystal display panel made up of a plurality of liquid crystal switching devices arranged in a matrix of rows and columns. Each set of 3 (or 4) adjacent switching devices makes up a picture element, or "pixel", for the display panel. Each one of the switching devices in each set thereof is formed with a semi-transparent filter disposed thereon having a different one of 3 (or 4) of the primary colors (red, blue, or green). Behind the panel is a white light source. The optical transmittance or non-transmittance of each one of the switching devices in the matrix is controlled by a voltage applied between opposite surfaces of the liquid crystal switching device. The applied voltage controls the rotation of the plane of polarization of the incident light and thereby the fractional portion of the incident light transmitted through a second polarizer (i.e. the analyzer). Thus, in response to one voltage level, the plane of polarization of the light exiting the liquid crystal switching device is aligned with that of the second polarizer so that the incident light passes through the second polarizer (albeit with the color of the filter disposed on the activated switching device) while in response to another voltage level, the plane of polarization is orthogonal to that of the second polarizer so that ideally none of the incident light passes through the switching device. In any event, it should be noted that much of the incident light may be lost even when the switching device is activated to transmit incident light. Further, in the three color case, each filter will allow, to a first approximation, only one-third of the incident light to pass through it. In practice, because of this and other effects, only about 2½ of the light incident on the first polarizer is completely transmitted through the succession of first polarzer, switching device, filter, and second polarizer (analyzer).

For viewability, in sunlight illumination, a typical display might require 200 fL of luminance output. To achieve this would generally require 8000 fL luminance of the light source, i.e. a light source comparable to the brightness of a snow field in full noonday sunlight. Such a combination of a multi-color liquid crystal display (LCD) and an 8000 fL light source borders on impracticality because of (a) the temperature rise due to light energy absorbed in the filters and polarizer (b) the power requirement of the light source and (c) the problem of dissipating heat generated by the light source. While the use of a field emission cathode array with a white phosphor screen has been suggested as an alternative white light source, the power required would still be significant.

An alternative to the above described white light source multi-color LCD display is the use of a plurality of switching devices again arranged in a matrix of rows and columns. Here, however, a single liquid crystal switching device is used for each pixel of the display. Furthermore, each of the switching devices is a monochrome device; that is, it does not- have a color filter. The array, however, is back lit with a light source adapted to produce light of the three primary colors. Conceptually, the back of the LCD panel would be sequentially illuminated in red, then blue, and then green, for example. Prior to each color illumination (i.e. color field), the switching devices in the LCD panel are addressed row by row and when addressed, each switching device in such row is set in either the transmittant, non-transmittant, or some transmissive level or state in between, in accordance with the information to be displayed. However, because of the time required for the switching device to change transmittance level or state, one must wait for the switching devices in the last row in the array to change state before the back is illuminated with a different color. Time delay must also be provided to account for light decay of the light source. Unfortunately, the time delays in this conceptual system are of such magnitude as to prevent its practical implementation. One technique suggested is to sweep a first one of three primary colors from a first edge of the display to the opposite edge of the display and then sweep a second color from the first edge to the opposite edge, the second color sweep being initiated prior to the termination of the sweep of the first color. Next, a third color is swept from the first edge to the opposite edge, such third color sweep being initiated prior to the termination of the second color sweep. Thus, the three colors appear to pass as waves from the first edge of the display to the opposite edge of the display. Some time is allowed between the termination of one color on a given row and the excitation of the next color, to allow for the finite time taken by the switching devices to change transmissivity in response to addressing signals.

SUMMARY OF THE INVENTION

It is, therefore, a primary object of the invention to provide an improved multi-color display.

It is another object of the invention to provide an improved multi-color liquid crystal display.

These and other objects of the invention are obtained generally by providing a display having as a light source thereof an electron tube. The electron tube has disposed in an evacuated envelope thereof a plurality of cathode means, each one thereof adapted to emit electrons in response to a control signal. A plurality of sets of at least one cathodoluminescent stripe is disposed within the envelope. Each one of said sets is associated with a corresponding one of the cathode means and is adapted to emit light with a predetermined one of a set of primary colors in response to electrons emitted by the corresponding cathode means striking such stripe. An anode for collecting electrons emitted by said cathode and/or secondarily emitted by the cathodoluminescent stripes is also disposed within the evacuated envelope.

More specifically, the proposed light source comprises an evacuated envelope having an array of stripes of cathodoluminescent phosphors disposed on a transparent face plate of such envelope. Means is included within the envelope for selectively exciting said phosphors. Such means includes an array of cathodes, control grids, and in one configuration, an array of beam deflecting elements by which the individual electron beams may be directed to one or another of the phosphor stripes according to the desired color of its emitted light.

In accordance with a preferred embodiment of the invention, a liquid crystal display is provided comprising: (a) a liquid crystal display panel comprising a plurality of liquid crystal switching devices disposed in a plane and arranged in a matrix of rows and columns; and, (b) a light source disposed behind such panel, such light source comprising: (i) a plurality of cathodoluminescent stripes disposed in a plane parallel to the plane of the liquid crystal display panel, such stripes being disposed parallel to the rows of switching devices, each such stripe being adapted to radiate with a predetermined one of a plurality of the primary colors in response to an electron striking such stripe, the colors radiated by such stripes alternating from one end of the panel to an opposite end of the panel; and (ii) a plurality of electron emitting means, arranged in rows, each one of such plurality of electron emitting means being in registration with a corresponding one of a plurality of sets of at least one of the stripes of the plurality of stripes, each one of such electron emitting means being adapted to emit electrons and direct such emitted electrons to strike at least one of the stripes in the sets thereof in registration therewith in response to a control signal. The liquid crystal display includes means for sequentially addressing rows of switching devices synchronously with supplying a sequence of control signals to the rows of electron emitting means. Furthermore, the addressing and control signals supplying means comprises means for supplying control signals to the plurality of electron- means to enable electrons to strike the ones of the plurality of stripes adapted to emit a common one of the plurality of the primary colors during a first color field time interval and, subsequently thereto, for supplying control signals to enable electrons to strike the stripes adapted to emit a common one of another one of the three primary colors during a succeeding color field time interval.

In accordance with a feature of the invention, the liquid crystal display is provided comprising a liquid crystal display panel, including a plurality of switching devices arranged in a matrix of rows and columns; and a light source disposed behind said liquid crystal display panel, said light source comprising a plurality of sets of at least one cathodoluminescent stripe; a plurality of cathodes each one thereof being in registration with a corresponding one of the plurality of sets of at least one cathodoluminescent stripe. Means are provided for addressing in sequence the rows of switching devices and providing data to each one of the switching devices in such address row synchronously as each one of the plurality of cathodes is, in response to control signals, enabled to provide electrons to the one of the plurality of sets of at least one cathodoluminescent stripe in registration therewith.

With such an arrangement, the light source is provided which provides adequate illumination for the liquid crystal display panel, has a relatively high degree of power efficiency, has a relatively thin geometry, and has a lifetime which is substantially independent of the number of on-off cycles of the cathode means.

BRIEF DESCRIPTION OF THE DRAWINGS

Other objects and many of the attendant advantages of the invention will be readily appreciated as the same becomes better understood by reference to the following detailed description when considered in connection with the accompanying drawings wherein.

DESCRIPTION OF THE PREFERRED EMBODIMENTS

Figure 1:
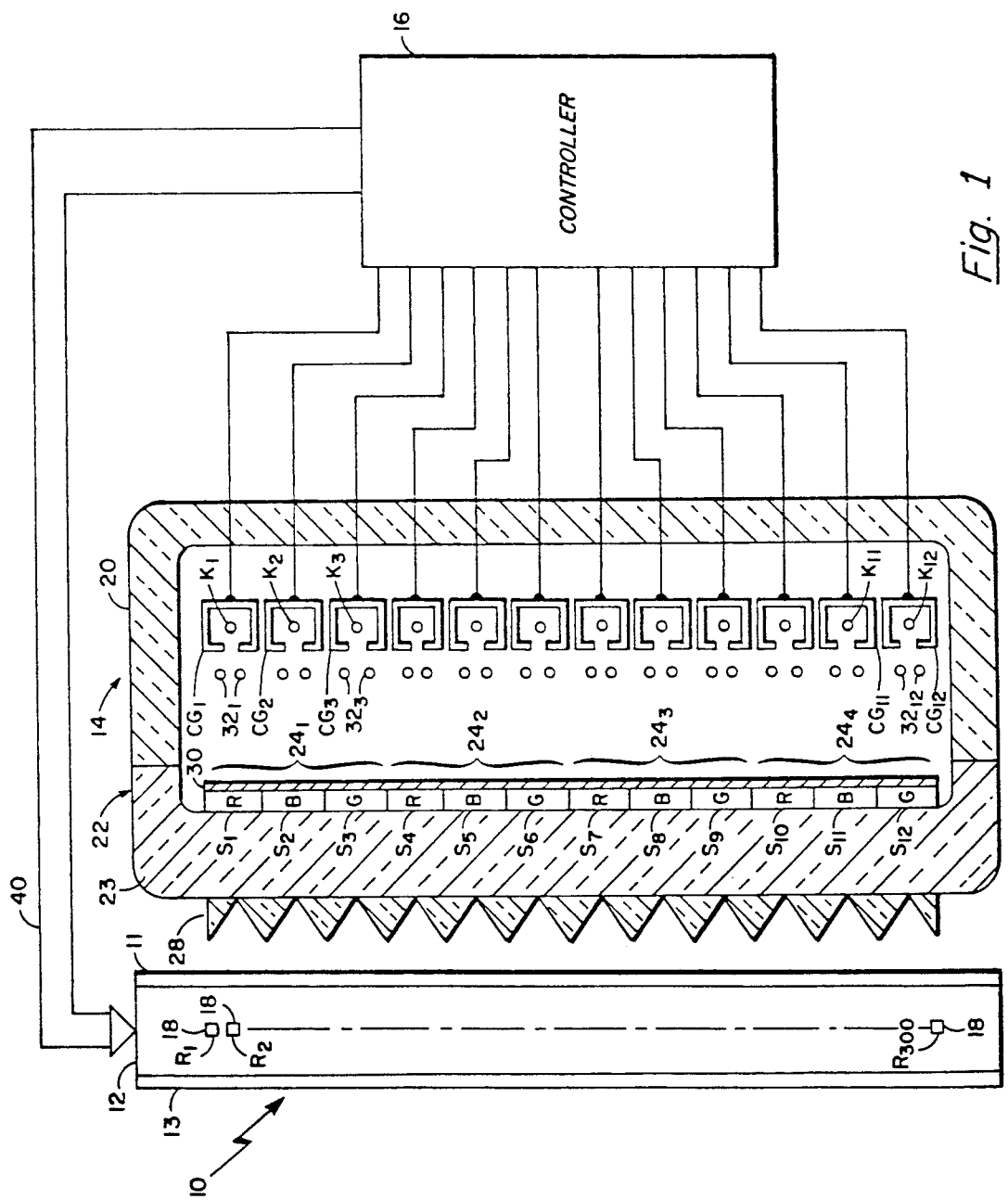
FIG. 1 is a schematic, cross-sectional diagram of a liquid crystal display according to a preferred embodiment of the invention.
Figure 2:
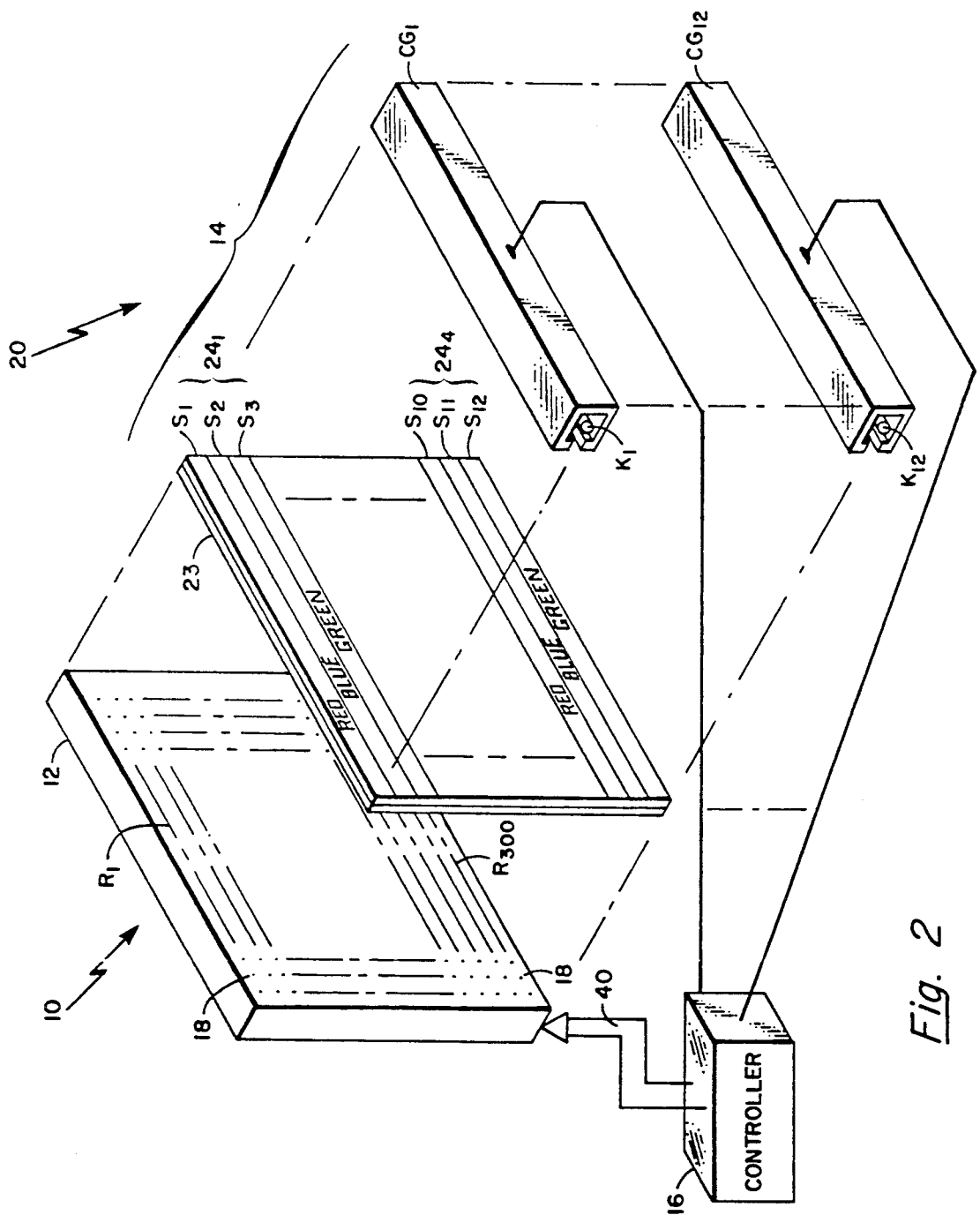
FIG. 2 is an exploded, isometric drawing, somewhat simplified, of the liquid crystal display of FIG. 1.

Referring now to FIGS. 1 and 2, a liquid crystal display (LCD) 10 is shown to include a multi-color liquid crystal display panel 12, a light source 14, disposed behind the LCD panel 12 to backlight such panel 12, and a controller 16, for providing control signals to the display panel 12 and the light source 14, in a manner to be described hereinafter. Suffice it to say here, however, that the LCD display panel 12 includes a plurality of liquid crystal switching devices 18, one per pixel, arranged in a matrix of rows and columns, here three-hundred regularly spaced rows $R_1$-$R_{300}$. A polarizer 11 is disposed on one surface of the panel 12 and an analyzer 13 is disposed on the opposite surface of the panel 12, as shown in FIG. 1 (not shown in FIG. 2 for simplicity).

The light source 14 is an electron tube 20 having disposed in an evacuated envelope 22 (not shown in FIG. 2) thereof, a plurality of, here 12, juxtapositioned cathodoluminescent stripes $S_1$-$S_{12}$ regularly spaced from top to bottom and disposed on a suitable planar faceplate, or substrate, here a glass substrate 23 of the envelope 22 using any conventional deposition technique. The stripes $S_1$-$S_{12}$ are disposed parallel to the rows $R_1$-$R_{300}$ of switching devices 18. Hence, it follows that, in front of each one of the stripes $S_1$-$S_{12}$ are twenty-five rows of the switching devices 18. The plurality of stripes $S_1$-$S_{12}$ is arranged in groups, here into four groups $24_1$-$24_4$, each group having included therein cathodoluminescent stripes adapted to produce all three of the primary colors. Thus, here a three primary color system is used and hence, each one of the four groups $24_1$-$24_4$ is a triplet which includes three stripes adapted to produce red, green, and blue light, respectively, in response to striking electrons. Thus, here stripes $S_1$, $S_4$, $S_7$, $S_{10}$ produce red light; stripes $S_2$, $S_5$, $S_8$, $S_{11}$ produce blue light; and stripes $S_3$, $S_6$, $S_9$, $S_{12}$ produce green light. A thin film 30 of electrically conductive material, here aluminum (not shown in FIG. 2), is evaporated over the cathodoluminescent stripes $S_1$-$S_{12}$ to provide an anode for the electron tube 20. Also disposed in the evacuated envelope of the tube is a plurality of, here 12, thermionic cathodes $K_1$-$K_{12}$. It is noted however, that the cathodes $K_1$-$K_{12}$ may alternatively be field emission cathodes or photo cathodes. The cathodes $K_1$-$K_{12}$ are regularly spaced from top to bottom and are displaced laterally from the substrate 23, as shown. Each one of the cathodes $K_1$-$K_{12}$ is adjacent to a corresponding one of a plurality of control grids $CG_1$-$CG_{12}$. Disposed between the control grids $CG_1$-$CG_{12}$ and the thin film anode 30 may be a plurality of accelerator electrodes $32_1$-$32_{12}$ (not shown in FIG. 2). The cathodes $K_1$-$K_{12}$ are elongated structures disposed in a plane parallel to the plane of the substrate 23. Each one of the cathodes $K_1$-$K_{12}$ is in registration with a corresponding set of the stripes $S_1$-$S_{12}$, here a corresponding one of the cathodoluminescent stripes $S_1$-$S_{12}$, respectively. Finally, a light diffuser 28 (not shown in FIG. 2) is disposed on the faceplate and serves to spread light emitted from each one of the cathodoluminescent stripes $S_1$-$S_{12}$ uniformly over an area of at least three cathodoluminescent stripes (i.e., over one primary color set) thereby creating a color field of nearly uniform intensity over the entire display 10, or portion of the display 10, that is intended to be useable in that particular color at the time in a manner to be described in more detail hereinafter. The diffuser 28 may be integrally formed with the faceplate in the form of a ground glass surface, or could be a separate element such as an embossed plastic film which could, if desired, be bonded to the faceplate, as shown in FIG. 1. Here, diffuser 28 improves illumination uniformity by selectively refracting light from the center of each one of the cathodoluminescent stripes towards the adjacent areas.

The controller 16 provides addressing signals, to the LCD panel via a bus 40, such addressing signals being used to address the rows of switching devices while data are fed in parallel to all of the columns of switching devices 18 in the addressed row. Thus, as each one of the rows $R_1$-$R_{300}$ is addressed in sequence, the displayed information, i.e., the data used to establish the desired polarization orientation of the liquid crystal switching devices 18 (and hence the transmissivity of the panel 12 at the pixel locations of the addressed devices 18), is fed simultaneously to the columns of the devices 18. Thus, only the devices 18 in the one of the rows addressed by the controller 16 will have the devices 18 therein written with the applied color data. Synchronously with the addressing signals fed to the LCD display 10 control signals are fed to the control grids $CG_1$-$CG_{12}$ by controller 16 by conductors which feed in a conventional manner into the evacuated envelope 22. More particularly, here the frame period of (1/60) seconds or 16.67 milliseconds (ms) is used. Thus, here with a three color field system, each color field time is $(\frac{1}{3}) \times (1/60) = (1/180)$ of a second or 5.56 ms. Thus, with the system described herein using three-hundred rows of switching devices, addressing signals are supplied row to row every $(1/300) \times (1/180)$ of a second or once every 18.5 microseconds. The control grids $CG_1$-$CG_{12}$ for the cathodes $K_1$-$K_{12}$ are turned on and off sequentially in accordance with the following Table where time is measured from the start of each frame.

TABLE

| Control Grid | Time "on" (ms) | Time "off" (ms) |
| --- | --- | --- |
| $CG_1$ | 1.39 | 4.63 |
| $CG_2$ | 7.41 | 10.65 |
| $CG_3$ | 13.43 | 16.67 |
| $CG_4$ | 2.78 | 6.02 |
| $CG_5$ | 8.80 | 12.04 |
| $CG_6$ | 14.81 | 18.06 |
| $CG_7$ | 4.17 | 7.41 |
| $CG_8$ | 10.19 | 13.43 |
| $CG_9$ | 16.20 | 19.44 |
| $CG_{10}$ | 5.56 | 8.80 |
| $CG_{11}$ | 11.57 | 14.81 |
| $CG_{12}$ | 17.59 | 20.83 |
| $CG_1$ | 18.06 | 21.30 |

Figure 3:
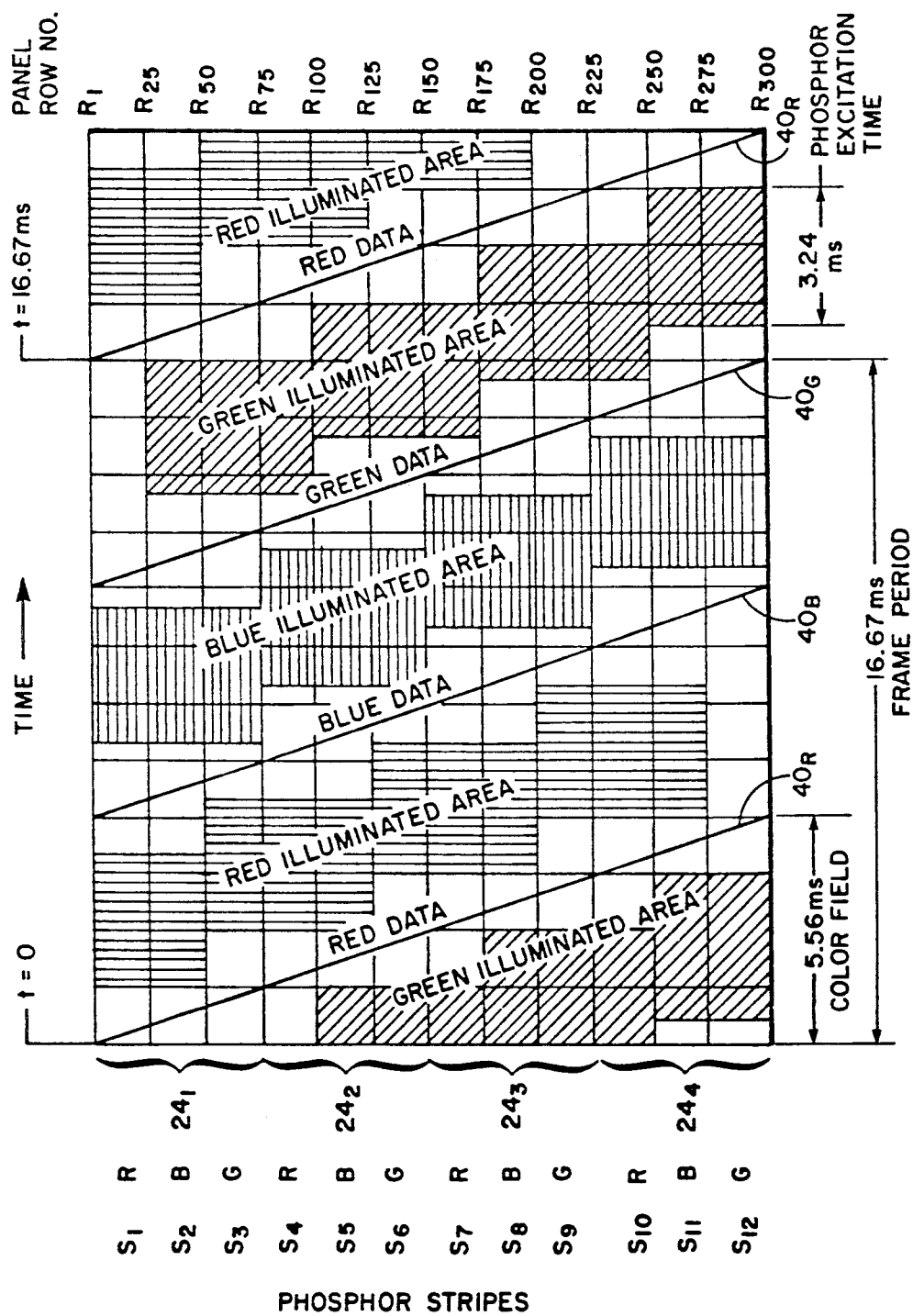
FIG. 3 is a timing diagram useful in understanding the relationship between the time red, blue and green data are being written into the display of FIG. 1 and the spatial relationship between rows of red, blue, and green cathodoluminescent stripes.

Referring now to FIG. 3, a timing chart is shown where time is measured along the horizontal axis and space is measured along the vertical axis. As here illustrated, the top of the vertical axis corresponds to the top of the display panel 12, and the bottom of the vertical axis corresponds to the bottom of the display panel 12. Thus, the chart is arranged in twelve vertical rows corresponding to the cathodoluminescent stripes $S_1$-$S_{12}$, respectively, and hence, likewise, corresponding to the cathodes $K_1$-$K_{12}$ respectively, in registration with such stripes $S_1$-$S_{12}$. The time during which the control grid $CG_1$-$CG_{12}$, associated with the cathode $K_1$-$K_{12}$, respectively, allows electrons emitted by the cathodes $K_1$-$K_{12}$ to pass to, and thereby strike, the cathodoluminescent stripe in registration therewith, (and thereby enable light of a particular color to be radiated by such cathodoluminescent stripe) is indicated by the shaded area. More particularly, the shaded areas indicated with vertical shading correspond to the time electrons strike the red stripes; the time during which electrons strike the green stripes is indicated by the shaded areas shown with diagonal shading; and, the shading with horizontal lines indicates the time when the blue stripes are being struck with electrons. The extension of the shading beyond the boundaries of the corresponding phosphor stripes indicates that the light from each stripe illuminates a three stripe-wide area (i.e., a triplet) on the panel 12. The color field period is hereby defined as the time addressing signals are fed to all of the three hundred rows for one of the three color fields. That is, a color field period is the period of time during which red, green, or blue data are being written into all of the three-hundred switching devices. It should be noted that when referring to FIG. 3, time $t=0$ has been defined in the timing chart shown in FIG. 3 as the mean (or average) time when switching devices 18 in row $R_1$ have fully responded to red addressing signals. The responses of switching devices 18 in subsequent rows to red addressing signals is represented by diagonal line $40_R$. It is also noted that the response of devices 18 to the red data writing cycle (i.e., the red color field period) terminates at about $t=5.56$ ms at which time the devices in row $R_1$ have fully responded to blue data (i.e., the blue color field period) as indicated by the beginning of the diagonal line $40_B$. The devices 18 in the three-hundred rows $R_1$-$R_{300}$ respond to the blue data until $t=11.11$ ms at which time the devices in row $R_1$ have fully responded to green data. The response of the devices 18 to the green data is indicated by the diagonal line $40_G$, until 16.67 ms from the time herein defined as time $t=0$. From the chart, phosphor excitation has a time duration of about $t=3.24$ ms. Further, it should be noted that during the time the switching devices behind each triplet are changing state, none of the cathodoluminescent stripes in such triplet is excited. That is, referring to FIG. 3, it is noted that none of the stripes $S_1$-$S_{12}$ is struck with electrons during the time the switching devices 18 behind such stripes $S_1$-$S_{12}$ are changing state. Thus, none of the solid diagonal lines $40_R$, $40_G$, $40_B$ in the timing chart of FIG. 3 crosses any of the shaded areas. It is noted that the display 10 may produce more than one color at the same time. That is, there are times when different portions of the display 10 will simultaneously be producing two colors. For example, considering a period of time when the rows of pixels between row $R_{151}$ and row $R_{225}$ have changed from the green state to the red state (the time between when diagonal line $40_R$ crosses row $R_{151}$ and when diagonal line $40_R$ crosses row $R_{225}$), it is observed that the first two red phosphor stripes $S_1$ and $S_4$ and the fourth green phosphor stripe $S_{12}$ are simultaneously excited, illuminating rows $R_1$-$R_{125}$ of the panel with red light, and rows $R_{251}$-$R_{300}$ with green light. It should be noted that the second red stripe $S_4$ was not excited until the change of state of the devices 18 in row $R_{151}$ to allow time for all the switching devices 18 in rows $R_{51}$-$R_{125}$ to assume their proper orientation for red before that part of the display was displayed in red, that is, the rows in registration with the second red stripe $S_4$. The bottom green phosphor stripe $S_{12}$ is turned off well before state changes occur in devices 18 in row $R_{251}$ to allow time for the luminescence to decay by the time the LCD switching devices 18 are fully reset for displaying red information. Thus it is noted that the red color is swept from a first edge of the display (here the top) to the opposite edge of the display (here the bottom) and then the blue color is swept from the top to the bottom, the blue color sweep being initiated prior to the termination of the red color sweep. Next, the green color is swept from the top to the bottom, such green sweep being initiated prior to the termination of the blue color sweep. Thus, the three colors appear to pass as three consecutive waves down the display. It is also noted that some time is allowed between termination of one color and the excitation of the next color, to allow for the finite time taken by the switching devices to change transmissivity in response to addressing signals.

Minor modification may be needed in the on and off timing of the phosphor stripe excitation to account for such things as differences in phosphor decay times and spreading of light beyond the intended boundaries. Another likely modification will be the addition of a fractional-width green stripe with associated cathode and control grid at the top, and a fractional-width red stripe with associated cathode and control grid at the bottom, to allow the top and bottom edges of the display to be illuminated in all three colors.

Figure 4:
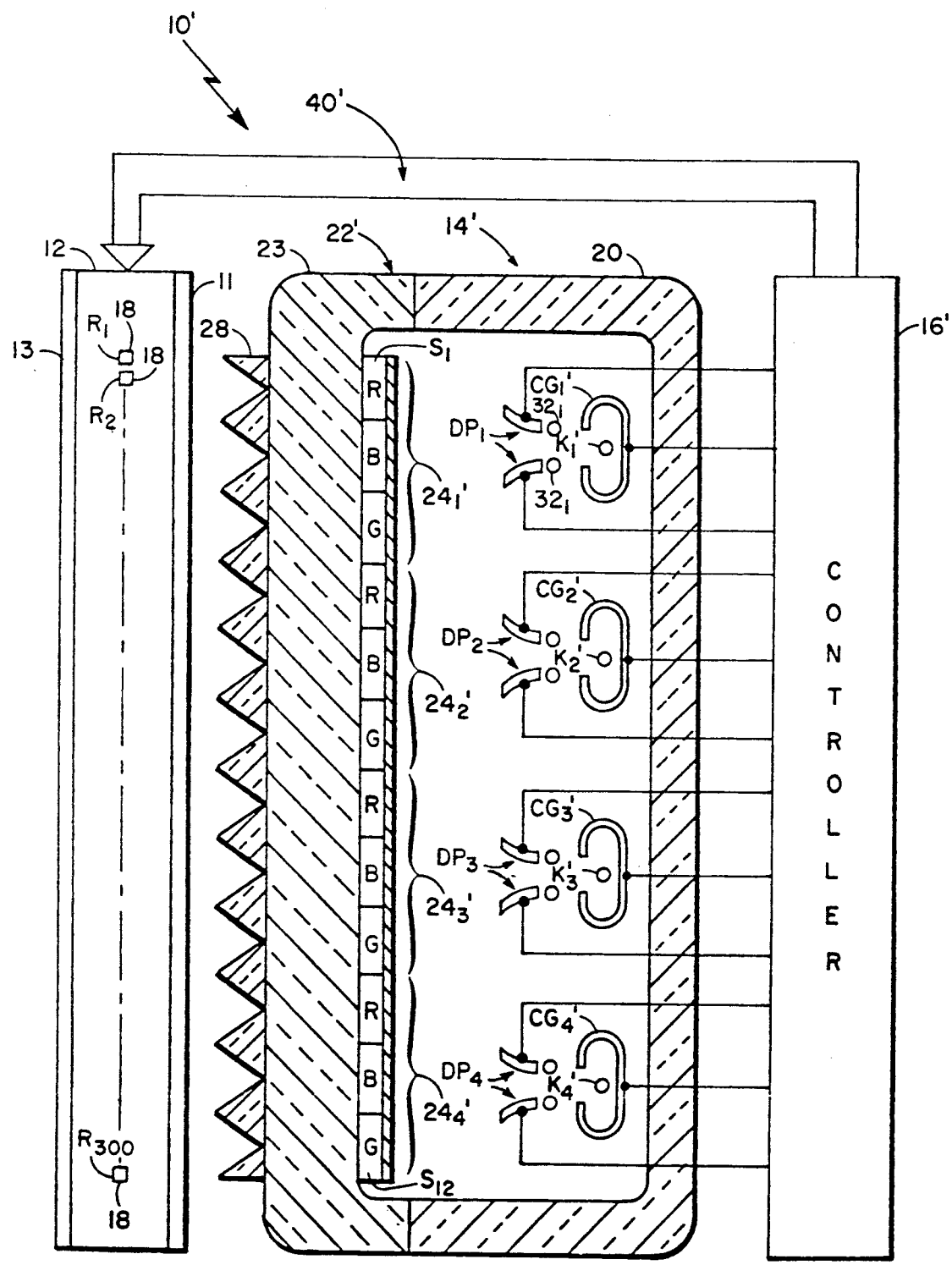
FIG. 4 is a schematic, cross-sectional diagram of a liquid crystal display according to an alternate embodiment of the invention.

Referring now to FIG. 4, an alternative liquid crystal display 10' is shown to include the multi-color liquid crystal display panel 12 described above in connection with FIGS. 1 and 2. The light source 14' again includes an envelope 22' and a plurality of, here 12, juxtapositioned cathodoluminescent stripes $S_1$-$S_{12}$. The plurality of stripes $S_1$-$S_{12}$ is arranged into sets, here four sets $24_1'$-$24_4'$, each set having included therein three of the cathodoluminescent stripes of the three primary colors. Here however, included within the envelope 22' are only four cathodes $K_1'$-$K_4'$, each one in registration with a corresponding one of the four sets of stripes $24_1'$-$24_4'$, respectively, as shown. Disposed around the rear, and side portions, of the cathodes $K_1'$-$K_4'$, are control grids $CG_1'$-$CG_4'$, respectively, as shown. Associated with each one of the cathodes $K_1'$-$K_4'$ is a pair of deflection plates, $DP_1$-$DP_4$, respectively, as shown. Each one of the pair of deflection plates $DP_1$-$DP_4$ is similar to the pair of deflection plates used in a cathode ray tube. Here the controller 16' sequentially enables the control grids $CG_1'$-$CG_4'$ and also produces voltages for each one of the pair of deflection plates $DP_1$-$DP_4$. When the voltage applied to the upper one of a pair of the deflection plates $DP_1$-$DP_4$, is negative relative to the potential of the lower one of the pair of deflection plates $DP_1$-$DP_4$, electrons emitted by the associated cathode are directed in a downwardly (as here illustrated) direction. When the voltage applied to the lower one of a pair of the deflection plates $DP_1$-$DP_4$, is negative relative to the upper one of the pair of deflection plates $DP_1$-$DP_4$, electrons emitted by the associated cathode are directed in an upwardly direction. When there is no voltage difference between the upper and lower plates the electrons emitted by the cathode associated therewith are not deflected by the plates and progress horizontally. Thus, when controller 16' enables control grid $CG_1'$ to pass electrons emitted by cathode $K_1'$ the controller 16' produces a three-step voltage sequence for the pair of deflection plates $DP_1$ to first direct electrons in an upwardly direction to strike stripe $S_1$, to next direct electrons in a horizontal direction to strike stripe $S_2$, and finally, to direct electrons in a downwardly direction to strike stripe $S_3$. Control grids $CG_2'$, $CG_3'$ and $CG_4'$ are sequentially enabled by controller 16' and, as each one of these control grids is enabled controller 16' produces the three step voltage sequence on the deflection plates $DP_2$-$DP_4$ to thereby enable electrons emitted from cathodes $K_1'$-$K_4'$ to produce the illumination effect described above in connection with FIG. 3.

Having described the preferred embodiment of the invention, other embodiments incorporating these concepts will now become apparent to those of skill in the art. For example, a two, four, or more primary color arrangement may be used. Further, the number of stripes and the number of rows of switching devices may be changed from the arrangement herein described. Further, it is noted that the terms "rows" and "columns" may be interchanged. It is felt, therefore, that this invention should not be restricted to the preferred embodiments but rather should be limited only by the spirit and scope of the appended claims.

What is claimed is:

1. A display comprising:
   a display panel, including a plurality of switching devices arranged in a matrix of rows and columns; and,
   a light source means, disposed behind said display panel, for producing a sequence of different color illuminations, said light source means comprising: a plurality of sets of at least one cathodoluminescent stripe, each of said at least one stripe being disposed parallel to one of the rows of switching devices; a plurality of means for emitting electrons, each one thereof being in registration with a corresponding one of the plurality of sets of at least one cathodoluminescent stripe; and means for collecting said electrons.

2. The display recited in claim 1 wherein the display panel is a liquid crystal display panel.

3. The display recited in claim 1 including means for addressing in sequence the rows of switching devices and providing data to each one of the switching devices in said addressed row synchronously as each one of the plurality of electron emitting means is enabled in response to control signals, to provide electrons to the ones of the plurality of sets of at least one cathodoluminescent stripe in registration therewith.

4. The display as recited in claim 3 wherein the addressing means comprises means for sweeping a first one of a plurality of primary color emitted by a first portion of the plurality of sets of at least one stripe across the display and then sweeping a second one of the plurality of primary colors emitted by a second portion of the plurality of sets of at least one stripe across the display, said second color sweep being initiated prior to the termination of the first color sweep.

5. The display as recited in claim 4 wherein the display panel is a liquid crystal display panel.

6. A display comprising:
   (a) a panel comprising a plurality of switching devices; and (b) a light source, disposed behind the panel, comprising:
  (i) a plurality of means, each one thereof being adapted to emit electrons in response to a control signal;
  (ii) a plurality of rows of cathodoluminescent stripes, said stripes being arranged in sets of at least one of the cathodoluminescent stripes, each one of said sets being associated with a corresponding one of the means, each of said stripes being adapted to emit light with a predetermined one of a set of primary colors in response to electrons emitted by the corresponding one of the plurality of means striking such stripe;
  (iii) an anode for collecting electrons emitted by said plurality of means; and
  (iv) wherein said plurality of means, plurality of sets of at least one cathodoluminescent stripe, and said anode are disposed in an evacuated envelope.

7. A display comprising:
(a) a display panel comprising a plurality of switching devices arranged in a matrix of rows and columns; and
(b) a light source disposed to illuminate such panel, said light source comprising:
  (i) a plurality of cathodoluminescent stripes, said stripes being disposed parallel to the rows of switching devices, each one of said stripes being adapted to emit light with a predetermined one of a plurality of primary colors in response to electrons striking said one of the stripes, the stripes being disposed with alternating emissive colors from a first end of the light source to an opposite end of the light source; and
  (ii) a plurality of means for emitting said electrons, such plurality of means being arranged in rows, each one of said plurality of electron emitting means being in registration with a corresponding one of a plurality of sets of at least one of the stripes, each one of said electron emitting means being adapted to emit said electrons and direct such emitted electrons to strike the at least one of the stripes in the set in registration therewith in response to a control signal.

8. The display recited in claim 7 including means for sequentially addressing rows of switching devices synchronously with supplying a sequence of control signals to the rows of electron emitting means.

9. The display recited in claim 8 wherein the addressing means comprises means for supplying control signals to the plurality of electron emitting means to enable electrons to strike the ones of the plurality of stripes adapted to emit a common one of the three primary colors during a first color field time interval and, subsequently thereto, for supplying control signals to enable electrons to strike the stripes adapted to radiate a common one of another one of the plurality of primary colors during a succeeding color field time interval.

10. The display recited in claim 9 wherein the addressing means comprises means for addressing in sequence the rows of switching devices and providing data to each one of the switching devices in said addressed row synchronously as each one of the plurality of electron emitting means is enabled in response to control signals, to provide electrons to the one of the plurality of sets of at least one cathodoluminescent stripe in registration therewith.

11. The display recited in claim 10 wherein the display panel comprises a liquid crystal display panel.

12. The display as recited in claim 7 wherein the addressing means comprises means for supplying said control signal to said plurality of electron emitting means for sweeping a first one of said primary colors emitted by a first portion of the stripes from the first end of the light source to the opposite end of the light source and, subsequent to the initiation of the first sweep, sweeping a second one of said primary colors emitted by a second portion of the stripes from the first end to the opposite end of the light source, said second color sweep being initiated prior to the termination of the first color sweep.

13. The display recited in claim 12 wherein the display panel comprises a liquid crystal display panel.

14. A display panel comprising:
(a) a plurality of switching devices; and
(b) a light source means for illuminating said plurality of switching devices, said light source means comprising:
  (i) a plurality of cathodoluminescent illuminators adapted to illuminate with different colors in response to electrons striking said illuminators, different portions of the plurality of illuminators illuminating with the same color;
  (ii) means for emitting electrons and for directing said electrons to strike said illuminators in response to control signals; and
  (iii) means for producing a time sequence of such control signals for the electron emitting means to produce, from the illuminators in response to electrons striking such illuminators, a sequence of different color illuminations for the switching devices.

15. The display panel recited in claim 14 including means for addressing rows of the switching devices synchronously as the electron emitting means sequentially respond to the control signals.

16. The display panel recited in claim 15 wherein the electron emitting means comprises a plurality of cathode means and wherein the control signals are fed to the plurality of cathode means.

17. The display panel recited in claim 16 wherein the plurality of cathode means includes a plurality of cathodes, said cathodes being arranged in rows.

18. The display panel recited in claim 17 wherein the plurality of illuminators is arranged in rows.

19. The display panel recited in claim 15 wherein the addressing means comprises means for sweeping a first color emitted by a first portion of the plurality of illuminators across the light source and, subsequent to the initiation of the first sweep, sweeping a second color emitted by a second portion of the plurality of illuminators across the light source, said second color sweep being initiated prior to the termination of the first color sweep.

20. A display panel comprising:
(a) a plurality of switching devices; and
(b) a light source means for illuminating said plurality of switching devices, such light source means comprising:
  (i) a plurality of cathodoluminescent illuminators adapted to illuminate with different colors in response to electrons striking said illuminators, different portions of the plurality of illuminators illuminating with the same color;

(ii) means for emitting electrons and for directing said electrons to strike said illuminators in response to control signals; and (iii) addressing means for sweeping a first primary color emitted by a first portion of the illuminators across the light source and, subsequent to the initiation of the first sweep, sweeping a second primary color emitted by a second portion of the illuminators across the light source.

21. A display panel comprising:

(a) a light source comprising an electron tube and means for producing in said electron tube a time sequence of different colors with said colors emanating from the light source; and (b) a plurality of switching devices illuminated by the light source and adapted to control the transmissivity of the switching devices to the colors emanating from the light source.

22. The display panel recited in claim 21 including addressing means for producing, in sequence, a first primary color sweep across said light source, and a second primary color sweep across the light source, said second primary color sweep being initiated prior to the termination of the first primary color sweep.

23. The display panel recited in claim 22 wherein the addressing means provides the control signal to the switching devices synchronously as the colors are swept.

24. The display panel, recited in claim 21, wherein the producing means comprises a plurality of cathodes disposed within the electron tube.

25. The display panel, recited in claim 24, wherein the producing means comprises a plurality of cathodoluminescent materials of different colors disposed within the electron tube.

* * * * *